(12) United States Patent
Jairath

(10) Patent No.: US 7,444,536 B1
(45) Date of Patent: Oct. 28, 2008

(54) RMI-IIOP REQUEST FAILOVER MECHANISM

(75) Inventor: Pankaj Jairath, New Delhi (IN)

(73) Assignee: Sun Microsystems, Inc., Santa Clara, CA (US)

( * ) Notice: Subject to any disclaimer, the term of this patent is extended or adjusted under 35 U.S.C. 154(b) by 633 days.

(21) Appl. No.: 10/919,049

(22) Filed: Aug. 16, 2004

Related U.S. Application Data

(60) Provisional application No. 60/563,027, filed on Apr. 16, 2004.

(51) Int. Cl.
*G06F 11/00* (2006.01)

(52) U.S. Cl. .......................................................... 714/4
(58) Field of Classification Search ....................... 714/4
See application file for complete search history.

(56) References Cited

U.S. PATENT DOCUMENTS

| | | | |
|---|---|---|---|
| 5,862,328 | A | 1/1999 | Colyer |
| 6,185,695 | B1 * | 2/2001 | Murphy et al. .................. 714/4 |
| 6,591,272 | B1 | 7/2003 | Williams |
| 6,640,249 | B1 | 10/2003 | Bowman-Amuah |
| 6,643,652 | B2 | 11/2003 | Helgeson et al. |
| 6,715,145 | B1 | 3/2004 | Bowman-Amuah |
| 6,886,041 | B2 | 4/2005 | Messinger et al. |
| 7,072,934 | B2 | 7/2006 | Helgeson et al. |
| 7,281,050 | B2 * | 10/2007 | Dinker et al. ................. 709/229 |
| 2002/0007468 | A1 * | 1/2002 | Kampe et al. ................... 714/4 |
| 2002/0099970 | A1 * | 7/2002 | Zhao et al. ...................... 714/4 |
| 2003/0088659 | A1 * | 5/2003 | Susarla et al. ................ 709/223 |
| 2003/0177411 | A1 * | 9/2003 | Dinker et al. .................. 714/13 |
| 2003/0204647 | A1 * | 10/2003 | Jacobs et al. ................. 709/330 |
| 2004/0237092 | A1 | 11/2004 | Jairath |
| 2005/0238006 | A1 * | 10/2005 | Taylor et al. ................. 370/389 |
| 2005/0240840 | A1 * | 10/2005 | Taylor et al. ................. 714/724 |
| 2006/0069723 | A1 * | 3/2006 | Ferwerda et al. ............ 709/203 |

OTHER PUBLICATIONS

Clustering: Transparent Replication, Load Balancing, and Failover, Building Scalable and Highly Available E-Commerce Applications with Borland AppServer by Salil Deshpande Jan. 2000.*

(Continued)

*Primary Examiner*—Robert Beausoliel
*Assistant Examiner*—Amine Riad
(74) *Attorney, Agent, or Firm*—Robert C. Kowert; Meyertons, Hood, Kivlin, Kowert & Goetzel, P.C.

(57) ABSTRACT

Embodiments of a request failover mechanism may be used to failover requests from clients of server instances in a cluster to alternative server instances. One embodiment may use cluster-aware remote references that include the IIOP endpoints at which the application server instances forming the cluster listen to IIOP requests. Using a cluster-aware remote reference to an object on an application server instance, a request to the object may be failed-over to an alternate endpoint in the cluster when the primary endpoint is unreachable. In one embodiment, once a request for a referenced object is failed over to a new server instance, all the subsequent requests to that object will continue to go to the same server instance even if the original server instance becomes available. One embodiment may provide client-side IIOP request load balancing in clustered application server environments through a load balancer subsystem using the cluster-aware remote references.

74 Claims, 6 Drawing Sheets

OTHER PUBLICATIONS

*Java to IDL Language Mapping Specification*, version 1.3, Sep. 22, 2003 www.omg.org/docs/formal/03-09-04.pdf.
*Java Naming and Directory Interface Application Programming Interface (JNDI API)*; Sun Microsystems; Jul. 14, 1999; http://java.sun.com/j2se/1.5/pdf/jndi.pdf.
*Java Naming and Directory Interface Service Provider Interface (JNDI SPI)*; Sun Microsystems; Jul. 14, 1999; http://java.sun.com/j2se/1.5/pdf/jndispi.pdf.
"Enabling Support for Corba-Based Clients," Chapter 10, iPlanet, Nov. 25, 2002, 9 pages.

* cited by examiner

RMI-IIOP REQUEST FAILOVER MECHANISM

PRIORITY INFORMATION

This application also claims benefit of priority of provisional application Ser. No. 60/563,027 entitled "IIOP/RMI-IIOP Request Failover and Load-Balancing Mechanism" filed Apr. 16, 2004, whose inventor is Pankaj Jairath.

BACKGROUND OF THE INVENTION

1. Field of the Invention

This invention relates to network computing, and more particularly to failover for clients in clustered server environments.

2. Description of the Related Art

RMI (Remote Method Invocation) is a way that a programmer, using the Java programming language and development environment, can write object-oriented programming in which objects on different computers can interact in a distributed network. RMI is the Java version of what is generally known as a remote procedure call (RPC), but with the ability to pass one or more objects along with the request. The object can include information that will change the service that is performed in the remote computer. The object parameter-passing mechanism may be referred to as object serialization. An RMI request is a request to invoke the method of a remote object. The request has the same syntax as a request to invoke an object method in the same (local) computer. In general, RMI is designed to preserve the object model and its advantages across a network.

RMI is implemented as three layers:

A stub (proxy) program in the client side of the client/server relationship, and a corresponding skeleton at the server end. The stub appears to the calling program to be the program being called for a service.

A Remote Reference Layer that can behave differently depending on the parameters passed by the calling program. For example, this layer can determine whether the request is to call a single remote service or multiple remote programs as in a multicast.

A Transport Connection Layer, which sets up and manages the request.

A single request travels down through the layers on one computer and up through the layers at the other end.

IIOP (Internet Inter-ORB Protocol) is a protocol that makes it possible for distributed programs written in different programming languages to communicate over the Internet. IIOP is a critical part of a strategic industry standard, the Common Object Request Broker Architecture (CORBA). CORBA is an architecture and specification for creating, distributing, and managing distributed program objects in a network. CORBA allows programs at different locations and developed by different vendors to communicate in a network through an "interface broker."

An essential concept in CORBA is the Object Request Broker (ORB). An Object Request Broker (ORB) acts as a "broker" between a client request for a service from a distributed object or component and the completion of that request. ORB support in a network of clients and servers on different computers means that a client program (which may itself be an object) can request services from a server program or object without having to understand where the server is in a distributed network or what the interface to the server program looks like. Using ORBs, components can find out about each other and exchange interface information as they are running. To make requests or return replies between the ORBs, programs use the General Inter-ORB Protocol (GIOP) and, for the Internet, Internet Inter-ORB Protocol (IIOP). IIOP maps GIOP requests and replies to the Internet's Transmission Control Protocol (TCP) layer in each computer. Using CORBA's IIOP and related protocols, a company can implement programs that will be able to communicate with their own or other company's existing or future programs wherever they are located and without having to understand anything about the program other than its service and a name.

CORBA and IIOP assume the client/server model of computing in which a client program makes requests and a server program waits to receive requests from clients. When writing a program, an interface is used called the General Inter-ORB Protocol (GIOP). The GIOP is implemented in specialized mappings for one or more network transport layers. An important specialized mapping of GIOP is IIOP, which passes requests or receives replies through the Internet's transport layer using the Transmission Control Protocol (TCP). Other possible transport layers include IBM's Systems Network Architecture (SNA) and Novell's IPX.

An object adapter is a sub component in ORB that connects a request using an object reference with the proper code to service that request. The Portable Object Adapter, or POA, is a particular type of object adapter that is defined by the CORBA specification. A POA object manages the implementation of a collection of objects. The POA supports a name space for the objects, which are identified by Object IDs. A POA also provides a name space for POAs. A POA is created as a child of an existing POA, which forms a hierarchy starting with the root POA.

POAs may be transient or persistent. A Persistent Portable Object Adaptor (Persistent POA) is a POA that may be used to guarantee that the same CORBA ID is generated each time an object is activated.

The corbaloc URL (Universal Resource Locator) scheme provides "stringified" object references for obtaining or exchanging IORs (Interoperable References). The corbaloc URL scheme provides URLs that are familiar to people and similar to FTP and HTTP URLs.

CSIv2 (Common Secure Interoperability Version 2) is a specification that provides security enhancements to the CORBA infrastructure. CSIv2 defines the Security Attribute Service (SAS) that enables interoperable authentication, delegation, and privileges.

CosNaming is a CORBA Naming Service Implementation that provides the naming service for the Java Interface Definition Language (IDL).

Java Interface Definition Language (IDL) adds CORBA (Common Object Request Broker Architecture) capability to the Java platform, providing standards-based interoperability and connectivity. Java IDL enables distributed Web-enabled Java applications to transparently invoke operations on remote network services using the industry standard OMG IDL (Object Management Group Interface Definition Language) and IIOP (Internet Inter-ORB Protocol). Java IDL technology may be used by CORBA programmers who want to program in the Java programming language based on interfaces defined in CORBA Interface Definition Language (IDL). This is "business as usual" CORBA programming, supporting Java technology in a similar way as other languages such as C++ or COBOL.

Naming and directory services play a vital role in networks such as intranets and the Internet by providing network-wide sharing of a variety of information about users, machines, networks, services, and applications. The Java Naming and Directory Interface (JNDI) is a part of the Java platform that provides applications with a unified interface (API) to multiple naming and directory services. JNDI may be used to build powerful and portable directory-enabled applications. JNDI works in concert with other technologies in the Java 2 Platform, Enterprise Edition (J2EE) to organize and locate components in a distributed computing environment. Using JNDI, applications based on Java technology can store and retrieve named Java objects of any type. In addition, JNDI provides methods for performing standard directory operations, such as associating attributes with objects and searching for objects using their attributes.

The JNDI Service Provider Interface (SPI) provides an interface through which developers can write naming and directory service providers and make them available so that the corresponding services are accessible from applications that use the JNDI API. In this context, a service provider may be defined as a set of modules that together satisfy JNDI API requests. In addition, because JNDI allows the use of names that span multiple namespaces, one service provider implementation may need to interact with another in order to complete an operation. The SPI provides methods that allow different provider implementations to cooperate to complete client JNDI operations.

SSL (Secure Sockets Layer) is a security protocol that provides privacy over the Internet. The protocol allows client-server applications to communicate in a way that cannot be eavesdropped or tampered with. Using SSL, servers are always authenticated and clients are optionally authenticated.

PICurrent (Portable Interceptors Current) is a slot table, the slots of which are used by services to transfer their context data between their context and the request's or reply's service context. Each service that wishes to use PICurrent reserves a slot or slots at initialization time and uses those slots during the processing of requests and replies.

A container is an entity that provides life cycle management, security, deployment, and runtime services to components. A component is an application-level software unit supported by a container. J2EE components include development and deployment units in the EJB tier and Web tier. The components may include EJBs (Enterprise JavaBeans), JSPs (JavaServer Pages) and Servlets. Containers provide support for the components, providing for reliable and standardized component-specific services. Each type of container (e.g., EJB, web, JSP (JavaServer Pages), servlet, applet, and application client) provides component-specific services. An Application Client Container (ACC) is a container that supports application client components.

A DTD (Document Type Definition) is a description of the structure and properties of a class of XML files.

Enterprise JavaBeans (EJB) is an architecture for setting up program components, written in the Java programming language, that run in the server parts of a computer network that uses the client/server model. Enterprise JavaBeans is built on the JavaBeans technology for distributing program components (which are called Beans) to clients in a network. Enterprise JavaBeans offers enterprises the advantage of being able to control change at the server rather than having to update each individual computer with a client whenever a new program component is changed or added. EJB components have the advantage of being reusable in multiple applications. To deploy an EJB Bean or component, it must be part of a specific application, which is called a container.

Web program components of J2EE are generally known as servlets ("little" server programs). The application or container that runs the servlets is sometimes called an application server. A typical use of servlets is to replace Web programs that use the common gateway interface (CGI) and a Practical Extraction and Reporting Language (PERL) script. Another general use is to provide an interface between Web users and a legacy mainframe application. In Enterprise JavaBeans, there are two types of beans: session beans and entity beans. An entity bean is described as one that, unlike a session bean, has persistence and can retain its original behavior or state.

The EJB architecture is a server-side technology for developing and deploying components containing the business logic to enterprise distributed applications. EJB components are scalable, transactional and multi-user secure. The EJB specification describes a runtime environment explaining how an EJB should be developed, deployed and used. The runtime environment is the EJB server, which provides access to EJB using an execution environment with transactional service, distribution mechanisms, persistence management and security. The specification allows users to create EJB applications, freeing them from these low-level system details.

EJB uses transactions to ensure that only consistent states take place despite clients' concurrent access and failures. However, if the EJB server crashes, the service will be unavailable to clients because the object reference is invalid and the state cannot be accessed. Transaction properties (e.g., atomicity, consistency, isolation and durability) are insufficient to provide a highly available service.

Conventional application servers may be unable to work directly with CORBA applications such as rich clients because the application servers do not directly support CORBA objects. Objects created on containers of the application servers are not CORBA objects but RMI objects.

SUMMARY

Embodiments of a request failover mechanism are described that may provide high availability of remote references to objects on application server instances. These objects may be accessed by clients via the remote references using RMI-IIOP. A remote reference obtained by a client is highly available if invocations on it continue to work even after the application server instance in a cluster that published the primary endpoint of the remote reference becomes unavailable. In embodiments, the invocations are failed over to another accessible IIOP endpoint in the cluster. In one embodiment, the application server instances in the cluster may be homogeneous. In one embodiment, the information about the cluster, from the IIOP perspective, is stored in a configuration file for the server.

Embodiments of the request failover mechanism may be used to failover requests from clients that use either IIOP or RMI-IIOP to communicate with the application server instances in the cluster to alternative server instances. Via the request failover mechanism, if the application server instance in a cluster that published a remote reference becomes unavailable, additional requests for the remote reference are "failed over" to an alternate application server instance in the cluster. In one embodiment, once a request for a referenced object is failed over to a new application server instance, all the subsequent requests to that object will continue to go to the same server instance even if the original server instance becomes available.

In embodiments, to facilitate high availability of remote references, the remote references of the server objects may be published as cluster-aware. A cluster-aware remote reference includes the IIOP endpoints at which the application server instances forming the cluster listen to IIOP requests. Using a cluster-aware remote reference to an object on an application server instance, a request to the object may be failed-over to an alternate endpoint in the cluster when the primary endpoint is unreachable. In one embodiment, the client selects an alternate endpoint from the endpoints in the cluster-aware remote reference.

In one embodiment, the request failover mechanism may provide high availability of RMI-IIOP Enterprise Java Bean (EJB) references. In one embodiment, the request failover mechanism may also provide high availability of the application server name service. Note that some embodiments may also provide high availability for other objects on server instances in a cluster. In one embodiment, high availability of remote references is supported for RMI-IIOP invocations from standalone clients and Application Client Container (ACC) Clients. This high availability may be achieved by detecting failed requests and redirecting these requests to another application server instance in the cluster.

In one embodiment, the request failover mechanism may include a client-side failover subsystem and a server-side failover subsystem. The role of the server-side failover subsystem may include, but is not limited to, the following tasks: generating cluster-aware remote references and handling EJB reference failover. The client-side failover subsystem works with the server-side failover subsystem to support high availability of remote references. The role of the client-side failover subsystem in supporting high availability may include, but is not limited to, the following tasks: selecting an alternate endpoint during failover; ensuring "stickiness" of the failed-over references; detection of communication failure with the application server; and tagging requests for EJB reference failover.

One embodiment may also provide client-side IIOP request load balancing in clustered application server environments through a load balancer subsystem. Load balancing refers to the process of distributing requests from clients to different application server instances. Some embodiments may support one or both of two types of load balancing policies: lookup-based and Initial Context (IC)-based. Other embodiments may support one or more other types of load balancing policies.

Figure 1A:
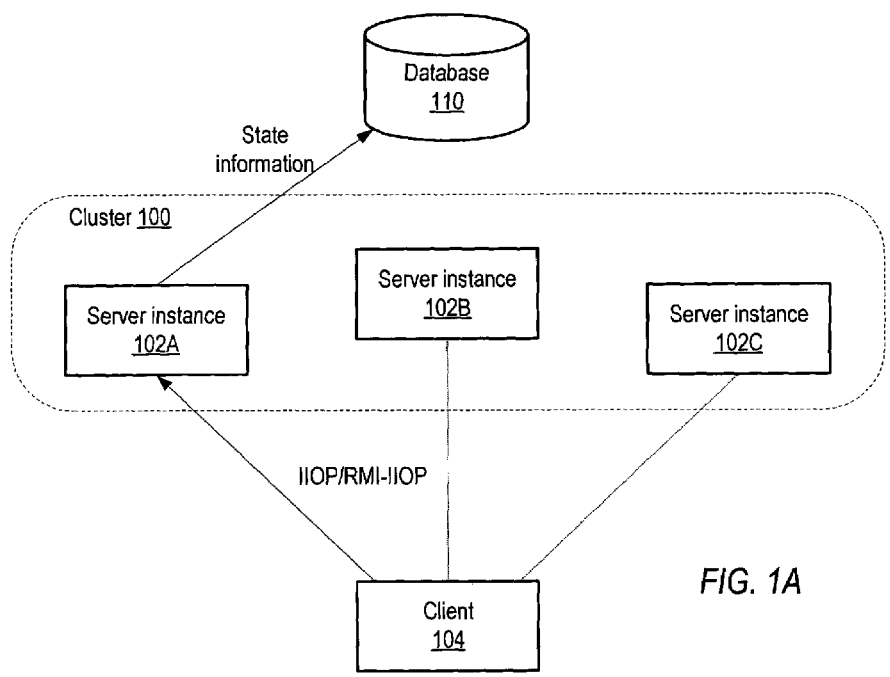
FIGS. 1A-1C illustrate failover of a client accessing an application server instance in a cluster according to one embodiment.

While the invention is described herein by way of example for several embodiments and illustrative drawings, those skilled in the art will recognize that the invention is not limited to the embodiments or drawings described. It should be understood, that the drawings and detailed description thereto are not intended to limit the invention to the particular form disclosed, but on the contrary, the intention is to cover all modifications, equivalents and alternatives falling within the spirit and scope of the present invention as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF EMBODIMENTS

Embodiments of a request failover mechanism are described that may provide high availability of remote references to objects on application server instances in a clustered application server environment accessed by clients via the remote references using either IIOP or RMI-IIOP. A remote reference obtained by a client is highly available if invocations on it continue to work even after the application server instance in a cluster that published the primary endpoint of the remote reference becomes unavailable. In embodiments, the invocations are failed over to another accessible endpoint in the cluster.

A cluster is a group of application server instances that work together as one logical entity. A cluster provides a runtime environment for one or more applications. Application server instances within a cluster may be hosted on different machines or on the same machine. That is, application server instances may be grouped across different machines into a single cluster. Each application server instance in a cluster can host more than one application.

In a cluster server environment, the servers may be replicated using multiple nodes to provide alternative instances of the servers to clients that may be accessed if a current server instance being accessed by the client becomes unavailable for some reason. Embodiments of the request failover mechanism may be used to failover requests from clients that use IIOP or RMI-IIOP to communicate with the application server instances in the cluster to alternative server instances.

In one embodiment, all application server instances participating in the cluster have the same applications deployed. Hence, application server instances in a cluster may also be referred to as replicas. In one embodiment, a cluster includes two or more application server instances. In one embodiment, the application server instances are disjoint; there is no inter-instance communication. In one embodiment, the application server instances in the cluster may be homogeneous; the configuration in terms of applications, database connectivity, configuration of features, IIOP ports or Listeners (the ports at which the server instances listen for incoming IIOP requests), etc., are the same on all the application server instances in the cluster. Since each of the application server instances is a replica, the configuration of a Server 1 will be the same as Server 2 Server 3, etc. in the same cluster. In one embodiment, the information about the cluster, from the IIOP perspective, is stored in a configuration file for the server (e.g. server.xml file).

Via the request failover mechanism, if the application server instance in a cluster that published a remote reference becomes unavailable, additional requests for the remote reference are "failed over" to an alternate application server instance in the cluster. In one embodiment, once a request for a referenced object is failed over to a new application server instance, all the subsequent requests to that object will continue to go to the same server instance even if the original server instance becomes available. Thus, the stickiness of objects to server instances may be maintained after failover.

In embodiments, to facilitate high availability of remote references, the remote references of the server objects may be published as cluster-aware. A cluster-aware remote reference includes the IIOP endpoints at which the application server instances forming the cluster listen to IIOP requests. In one embodiment, the remote references are Interoperable References (IORs), and the IIOP endpoints are encoded into the IIOP profile of the IOR. Using a cluster-aware remote reference to an object on an application server instance, a request to the object may be failed-over to an alternate endpoint in the cluster when the primary endpoint is unreachable.

In one embodiment, a remote reference is an Interoperable Reference (IOR) for an object on an application server instance. Remote references are used by clients to invoke remote operations on application server instances in a cluster. In one embodiment, the Java object encapsulating the IOR is an RMI-IIOP stub. In this document, "remote reference" or "IOR" may be used to inclusively refer to references to objects including, but not limited to, EJB and Name Service objects, unless explicitly qualified, for example as an EJB reference or a Name Service reference. Remote references that are cluster-aware and thus can be failed over to an alternate application server instance in the cluster, if necessary, may be referred to as cluster-aware references or cluster-aware IORs. The terms "remote reference" and "IOR", may be used interchangeably herein to indicate cluster-aware remote references, unless otherwise specified.

The term endpoint refers to the host and port identifying an IIOP Listener on a target application server instance or Name Service in the cluster. The terms endpoint and IIOP Listener may be used interchangeably in this document. The ORB listens on the endpoint for incoming IIOP requests. A cluster-aware remote reference may contain one or more endpoints, including a primary endpoint and one or more alternate endpoints. A primary endpoint is the endpoint of the application server instance that created the IOR. The alternate endpoints are endpoints on other application server instances in the cluster. By default, all method invocations on the reference are dispatched to the primary endpoint by the ORB, provided the endpoint is reachable.

In one embodiment, the request failover mechanism may provide high availability of RMI-IIOP Enterprise Java Bean (EJB) references. In one embodiment, the request failover mechanism may also provide high availability of the application server name service. Note that some embodiments may also provide high availability for other objects on server instances in a cluster. In one embodiment, the request failover mechanism may provide high availability for remote references for the non-co-located case where the remote reference (client side) and the object referenced (server side) are in different virtual machines (e.g., JVMs). One embodiment may also provide high availability for remote references where the remote reference (client side) and the object referenced (server side) are in the same virtual machine.

Note that embodiments may support failover and load balancing for clients communicating with application server instances in the cluster using RMI-IIOP. Embodiments may support cluster-aware references in different deployment scenarios including one or more of, but not limited to, the following. These different client-server deployment scenarios are supported to provide high availability of remote references:

Java applications executing in an Application Client Container (ACC) accessing EJBs deployed on an application server instance;

Java Applications not executing in an ACC (standalone clients), accessing EJBs deployed on an application server instance;

Servlets/JSPs in web applications executing in a different JVM than the target application server instance. The web application could also be running in a non-application server web container; and EJBs executing in a different application server instance from the target application server instance.

The different clients for cluster-aware references may be referred to collectively as "client(s)". Clients executing in an Application Client Container (ACC) may be referred to as ACC clients; clients other than ACC Clients may be referred to as standalone clients. In one embodiment, high availability of remote references is supported for RMI-IIOP invocations from standalone clients and ACC Clients. This high availability may be achieved by detecting failed requests and redirecting these requests to another application server instance in the cluster.

In one embodiment, application server instances may also act as clients of other application server instances in the cluster or for application server instances in other clusters.

One embodiment may provide failover support of IIOP-over-SSL as well as IIOP invocations. IIOP-over-SSL failover may be provided for secure remote references that contain a CSIv2 tag component, which provides the security configuration including endpoints for the target of the reference.

In one embodiment, the request failover mechanism may include a client-side failover subsystem and a server-side failover subsystem. The server-side failover subsystem is responsible for providing the server-side infrastructure for supporting high availability of remote references. The role of the server-side failover subsystem may include, but is not limited to, the following tasks:

Generating cluster-aware remote references.

Handling EJB reference failover.

The client-side failover subsystem works with the server-side failover subsystem to support high availability of remote references. The role of the client-side failover subsystem in supporting high availability may include, but is not limited to, the following tasks:

Selecting an alternate endpoint during failover.

Ensuring "stickiness" of the failed-over references.

Detecting communication failure with the application server

Tagging requests for EJB reference failover

One embodiment may also provide client-side IIOP request load balancing in clustered application server environments through a load balancer subsystem. Load balancing refers to the process of distributing requests from clients to different application server instances and/or Name Services. A goal of load balancing is to spread the load evenly across the application server instances and/or Name Services in the cluster, thus providing higher scalability. Some embodiments may support one or both of two types of load balancing policies: lookup-based and Initial Context (IC) based load balancing. Other embodiments may support one or more other types of load balancing policies.

FIGS. 1-6 illustrate means for failing over remote references for RMI-IIOP clients of a cluster of application server instances from a failed application server instance to an alternate application server instance, and means for load balancing of requests from the RMI-IIOP clients among the application server instances in the cluster.

Figure 1B:
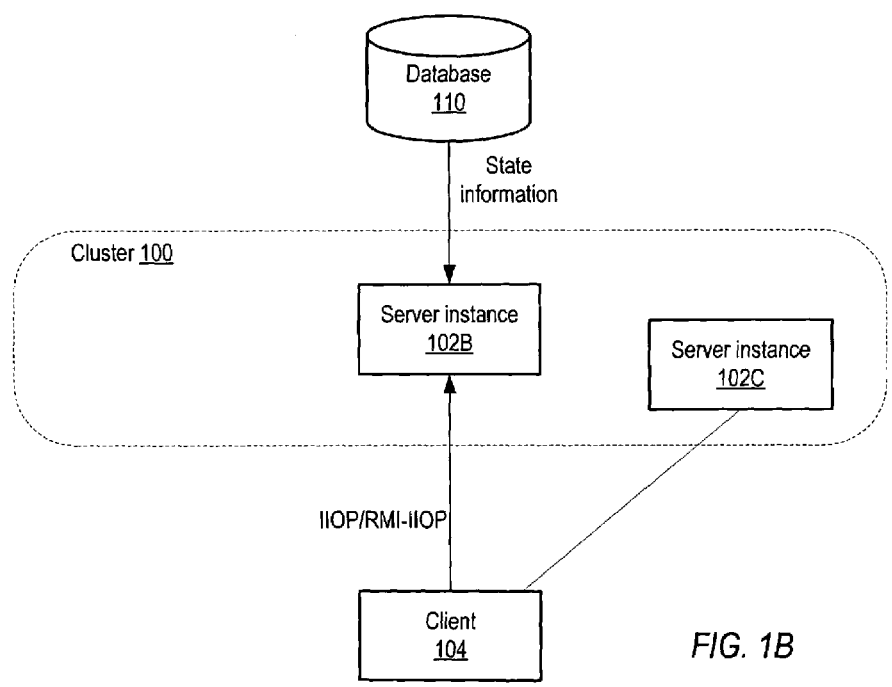
Figure 1C:
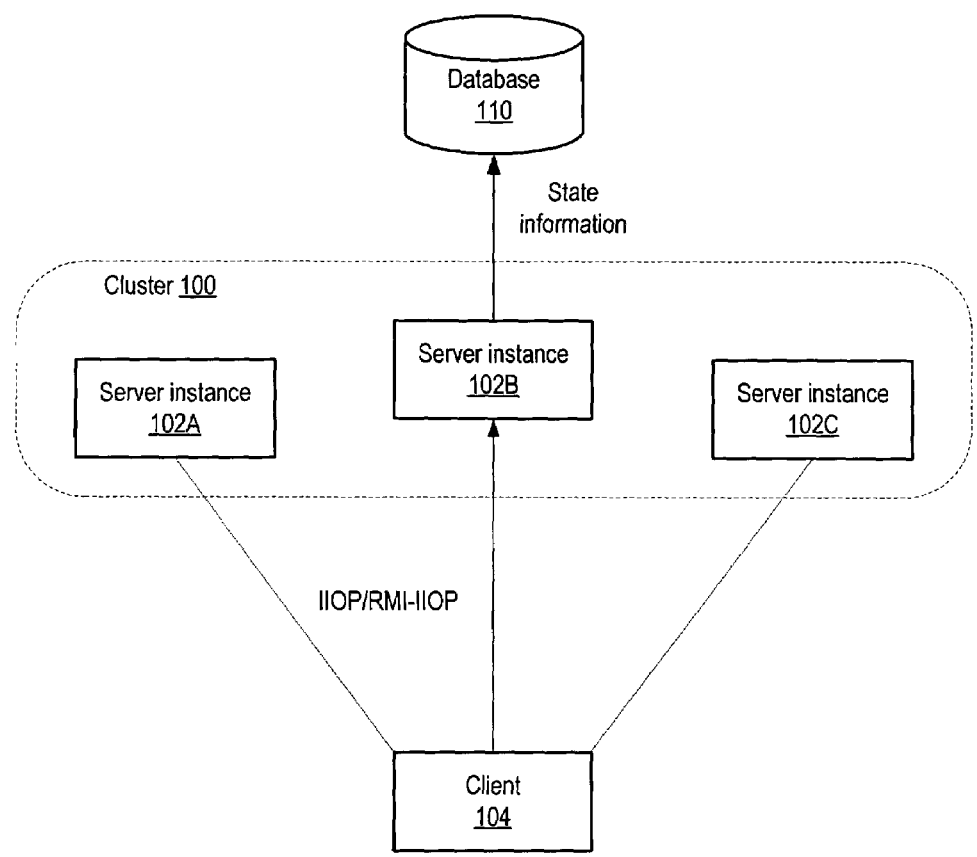

FIGS. 1A-1C illustrate failover of a client accessing an application server instance in a cluster according to one embodiment. In FIG. 1A, client 104 is accessing an object (e.g., an EJB) in server instance 102A of cluster 100. Cluster 100 also includes server instances 102B and 102C, which each include a replica of the same object. To access the object (not shown), server instance 102A may provide a cluster-aware remote reference (not shown) to the object to client 104. A cluster-aware remote reference includes endpoint information for all of the application server instances 102 in the cluster 100, as indicated by the dotted lines. On cluster 100, configuration information including, but not limited to, endpoint information for all servers 102 may be maintained in a server instance configuration file (not shown) by each server instance. Server instance configuration information, including, but not limited to, endpoint information for the server instances stored in the server instance configuration file may be included in the cluster-aware remote reference by the server-side failover subsystem when the remote reference is published to the client 104. As invocations (requests) are made on the object by client 104 via IIOP/RMI-IIOP, state information for the object is stored to a backend database 110.

In FIG. 1B, application 102A becomes unavailable. The next invocation on the object by client 104 will result in a communications failure. A client-side failover subsystem may then select an alternate endpoint on one of the other server instances 102, in this example server instance 102B, from the IIOP profile of the IOR, and then may send the request to the alternate server instance (server instance 102B, in this example). The request may include information required to uniquely identify the object from the server instance configuration information included in the cluster-aware remote reference; for example, for an EJB, the request may include the application name, the EJB jar name, and the EJB name. This information may be used on server instance 102B to identify the correct object the server instance 102B, locate and obtain the state information for the object from database 110, and then invoke the request on the object on server instance 102B.

In FIG. 1C, server instance 102A may again become available. The request failover mechanism insures that, once a request for the referenced object is failed over to the new server instance 102B, all the subsequent requests to that object will continue to go to the same server instance 102B even if the original server instance 102A becomes available.

Figure 2:
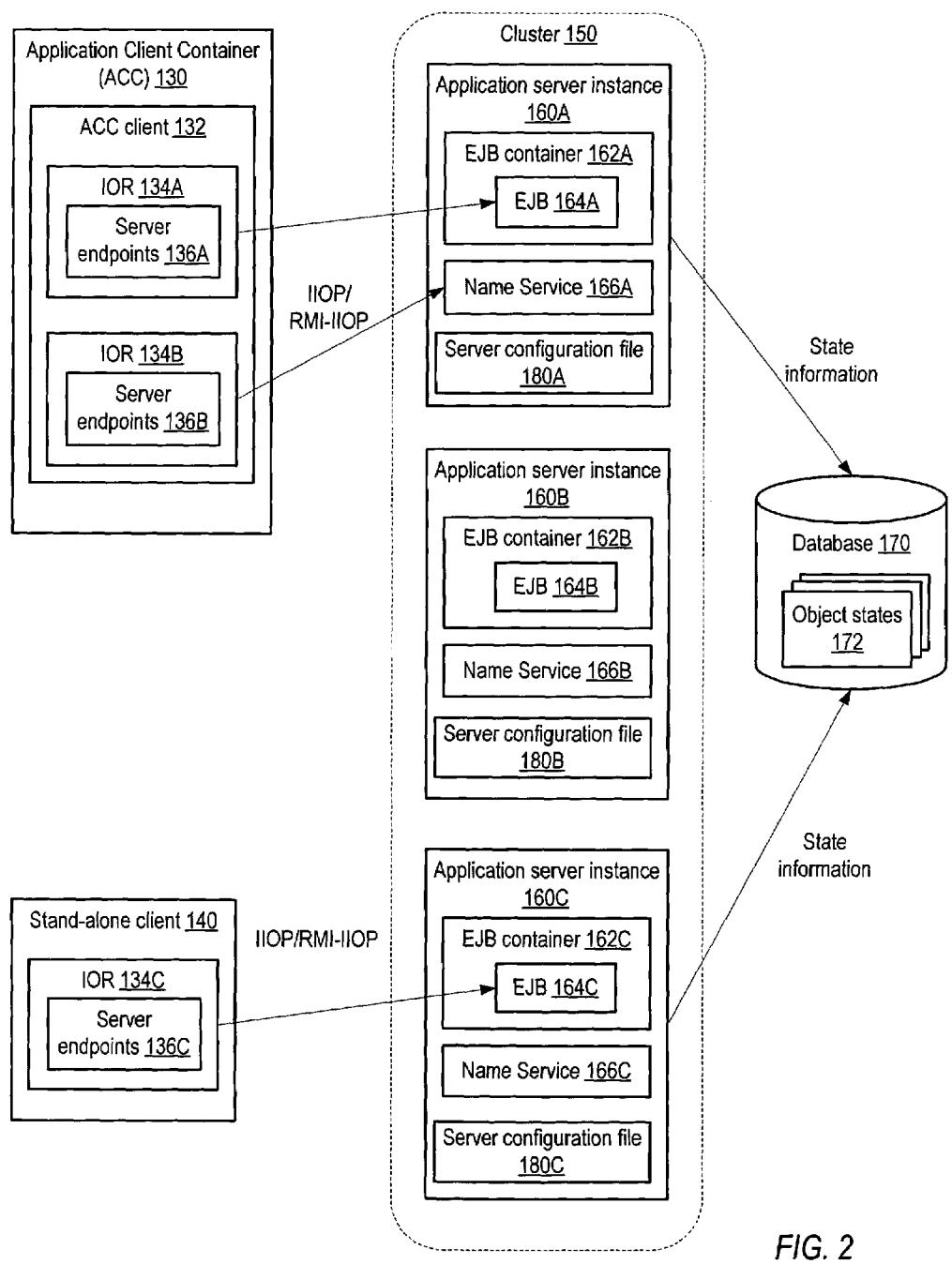
FIG. 2 illustrates an exemplary architecture of a clustered application server environment according to one embodiment.

FIG. 2 illustrates an exemplary clustered application server environment according to one embodiment. The client infrastructure includes a client-side failover subsystem (not shown) that performs failure detection and failover of a request. The server side implementation generates the cluster information used by the client infrastructure during failover.

On the server side, the server-side failover subsystem (not shown) maintains the configuration information of the cluster, including the IIOP ports for all the server instances within the cluster, and can build that information into the remote references that are provided to clients. A cluster 150 includes two or more application server instances 160. In one embodiment, the application server instances 160 are disjoint; there is no inter-instance communication. Server configuration information for the cluster is stored in a configuration file 108 for each server (e.g. server.xml). In one embodiment, the cluster may be homogeneous; each of the application server instances is a replica, and therefore the configuration of the application server instances 160A-160C will be the same. The configuration of the application server instances 160, in terms of applications, database connectivity, configuration of features, etc., are all the same on all the application server instances 160 in the cluster.

The cluster configuration is defined in the server configuration file 180 on each application server instance 160. Data that describes the IIOP ports for each of the application server instances 180, the ports at which the server instances listen for incoming IIOP/RMI-IIOP requests, is included in each of the server configuration files 180.

From a CORBA perspective, when a client looks up a bean, the container generates a remote reference (IOR). This remote reference, from the CORBA client's perspective, will have the IIOP endpoint of the server instance that published it as the primary endpoint. If, for example, the client is connected to application server instance 160A, as is ACC client 130 in this example, the remote reference (e.g. IOR 134A) will contain the IIOP endpoint of application server instance 160A as the primary endpoint. In addition to the primary endpoint, the IOR (e.g. IOR 134A) is populated with other endpoints on other application server instances 160 in cluster 150 as alternate endpoints. When the remote reference is published to the client, the client (stub) has the entire endpoint information of the cluster.

On the server side, CORBA-enabled containers use Portable Object Adapters (POAs). The POAs contain all references of all EJBs published by the container. The POAs are persistent POAs to enable persistent IORs.

IORs 134 obtained by the clients (e.g. ACC client 130 and standalone client 140) and encapsulated in the client stub contain the entire cluster information published by the application server instance 160 from which the IOR was obtained. If the application server instance 160 in the cluster 150 a client (e.g. standalone client 140) is currently connected to goes down, when the client makes a new request, the client will detect a CORBA communication failure for the application server instance 160 (e.g., a COMM FAILURE exception with a status of COMPLETED NO). When the communication failure is detected, the client looks in the IOR to determine an alternate IIOP endpoints in the cluster 150. For example, if application server instance 160C goes down, the client-side failover subsystem on standalone client 140 may look in server endpoints 136C of IOR 134C to find an alternate endpoint, for example an endpoint on application server 160B. In one embodiment, an IOR may contain one or more tag components. Tag components that contain the multiple alternate IIOP endpoints for the cluster may be referred to as tag alternate IIOP endpoints.

When the failure is detected, the client-side failover subsystem goes to the IOR 134, fetches an available IIOP endpoint from the server endpoints 136 in the IOR 134, and dispatches the request to the next alternate IIOP endpoint determined from the tag alternate IIOP endpoints. On the cluster side, the request will be dispatched to the application server instance 160 associated with the alternate IIOP endpoint. In one embodiment, if another communications failure is reported from the cluster 150, the client may continue trying alternate endpoints from the IOR 134 until all the alternate endpoints have been tried. If none of the alternate endpoints work, then a communications failure will be reported on the client indicating that none of the application server instances 160 in the cluster 150 is available to service the request.

During the life cycle of a client, all invocations made on an IOR 134 (e.g., IOR 134A) will typically be serviced by the application server instance 160 in the cluster 150 that provided the IOR (e.g., for IOR 134A, application server instance 160A)—in other words, IORs are "sticky" to the primary endpoint. If the application server instance 160 (e.g., application server instance 160A) becomes unavailable, the client will be failed over to an alternate application server instance 160 (e.g., application server instance 160B) using the alternate endpoint information in the IOR 134 (e.g., server endpoints 136A of IOR 134A). In one embodiment, a localization mechanism is provided to insure that the failed-over IOR remains "sticky" to the alternate endpoint during the remaining life cycle of the client, even if the original server instance that provided the failed-over IOR becomes available again.

When an IOR 134 is failed over to an alternate endpoint on an alternate application server instance 160, and the alternate application server instance 160 receives a request from the client on the IOR, the alternate application server instance 160 recognizes that the request is a failed-over request. The request includes an identifier for the target object of the request. In the cluster 150, a high-availability backend database 170 is used to persist the states of the target objects in the application server instances 160. When a state is established or changed in an application server instance 160, the state change is persisted in the backend database 170. When the alternate application server instance 160 receives a failed-over request, if it cannot find the state of the target object in memory, the state of the target object is obtained from the backend database 170.

In one embodiment, a load balancer subsystem on each of the clients is used to provide load balancing of requests among the application server instances 160 in cluster 150. In one embodiment, the load balancer subsystem randomly selects one of the endpoints from the list of IIOP endpoints provided in the JNDI SPI. When an application server instance 160 becomes available, the load balancer mechanism may dispatch new requests to the new application server instance.

In one embodiment, cluster 150 may be a homogeneous cluster. In other words, all of the application server instances 160 in the cluster have the same configuration and same set of applications. When deployment of an application takes place on the cluster 150, one or more EJBs are part of the application. Bean IDs are associated with the EJBs. The bean ID for an EJB in an application will be different on the different application server instances in the cluster 150. The bean ID is used in the IOR to associate it with state/instance of the referred EJB object in the server instance. If a request is failed over to another server instance, the server instance cannot recognize the application (EJB) from the bean ID, as the bean IDs are different on different server instances in the cluster. To overcome this, information is included in the request that may be used to generate the bean ID that is specific to the server instance. Referred to as container information, this information may include, but is not limited to, the application name, EJB jar name, and the EJB name. The container information is static information that is the same across server instances. The container information may be tagged into the IOR as a custom tag. The container information from the IOR then may be included in the invocation messages. When an application server instance receives a failed-over invocation message, the container information from the message may be used on the application server instance to determine the bean ID for the referenced bean on the application server instance, and the determined bean ID may then be used to generate the target object and to retrieve the state from the high-availability backend database 170.

Figure 3:
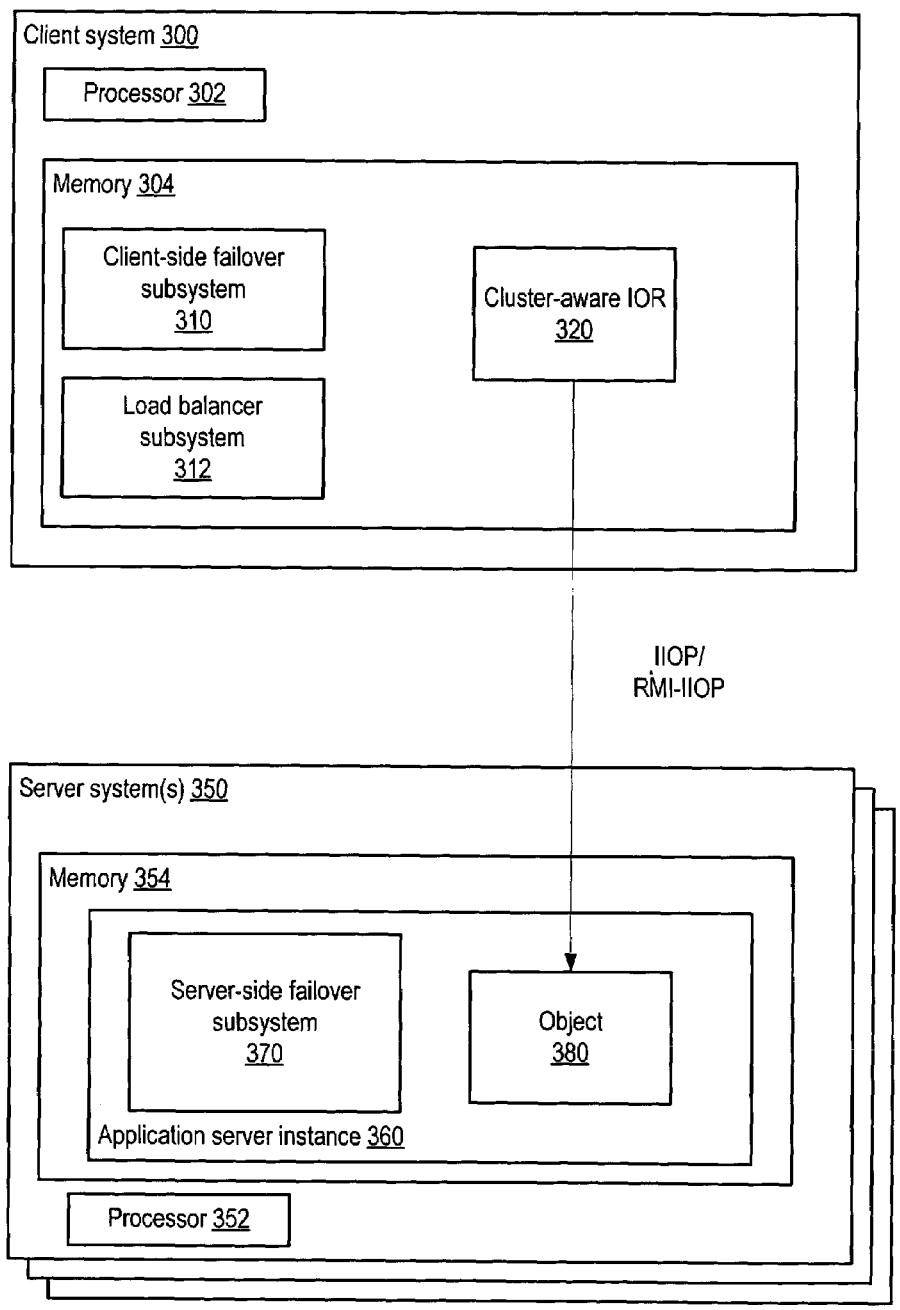
FIG. 3 illustrates a client system and a server system implementing a failover and load balancing mechanism according to one embodiment.

FIG. 3 illustrates a client system and a server system implementing a failover and load balancing mechanism according to one embodiment. Client system 300 may be any of various types of devices, including, but not limited to, a personal computer system, desktop computer, laptop or notebook computer, mainframe computer system, workstation, network computer, Portable Digital Assistant (PDA), smartphone, or other suitable device. Client system 300 may include at least one processor 302. The processor 302 may be coupled to a memory 304. Memory 304 is representative of various types of possible memory media, also referred to as "computer readable media." Hard disk storage, floppy disk storage, removable disk storage, flash memory and random access memory (RAM) are examples of memory media. The terms "memory" and "memory medium" may include an installation medium, e.g., a CD-ROM or floppy disk, a computer system memory such as DRAM, SRAM, EDO RAM, SDRAM, DDR SDRAM, Rambus RAM, etc., or a non-volatile memory such as a magnetic media, e.g., a hard drive or optical storage. The memory medium may include other types of memory as well, or combinations thereof.

Client system 300 may couple over a network, via wired or wireless network connections, to one or more server system(s) 350 hosting application server instances 360 in a cluster. Client system 300 may communicate with one or more application server instances 360 on server system(s) 350 using either IIOP or RMI/IIOP, depending on the client implementation. The network may be, for example, a Local Area Network (LAN), a Wide Area Network (WAN), a Storage Area Network (SAN), a LAN with Network-Attached Storage (NAS), or any network capable of coupling client systems to server systems. Server systems 350 may be any of various types of devices including, but not limited to, workstations, server computers, personal computer systems, desktop computers, laptop or notebook computers, mainframe computer systems, workstations, network computers, or any device suitable for hosting an application server instance. In one embodiment, the operating system platforms supported by server systems 350 may include one or more of, but are not limited to: Solaris SPARC 8 and 9 and Red Hat Linux 7.3 and 8. Note that other operating systems and versions of operating systems may be supported in some embodiments. Server system 350 may include at least one processor 352. The processor 352 may be coupled to a memory 354. Memory 354 is representative of various types of possible memory media, also referred to as "computer readable media." Hard disk storage, floppy disk storage, removable disk storage, flash memory and random access memory (RAM) are examples of memory media. The terms "memory" and "memory medium" may include an installation medium, e.g., a CD-ROM or floppy disk, a computer system memory such as DRAM, SRAM, EDO RAM, SDRAM, DDR SDRAM, Rambus RAM, etc., or a non-volatile memory such as a magnetic media, e.g., a hard drive or optical storage. The memory medium may include other types of memory as well, or combinations thereof.

Client system 300 may include, in memory 304, a client-side failover subsystem 310 and a load balancer subsystem 312 as described herein. A server system 350 may include, in memory, one or more application server instances 360 as described herein. Each application server instance may include a server-side failover subsystem 370 as described herein and one or more objects 380, e.g. EJBs or Name Services. Server-side failover subsystem 370 may handle generating cluster-aware IORs 320 for clients of the application server instance 360 for invoking objects 380. If an application server instance 360 becomes unavailable, client-side failover subsystem 310 may handle failover to another application server instance in the cluster using alternate endpoints in cluster-aware IOR 320 as described herein. Load balancer subsystem 312 may handle load balancing of requests to application server instances 360 as described herein.

Figure 4:
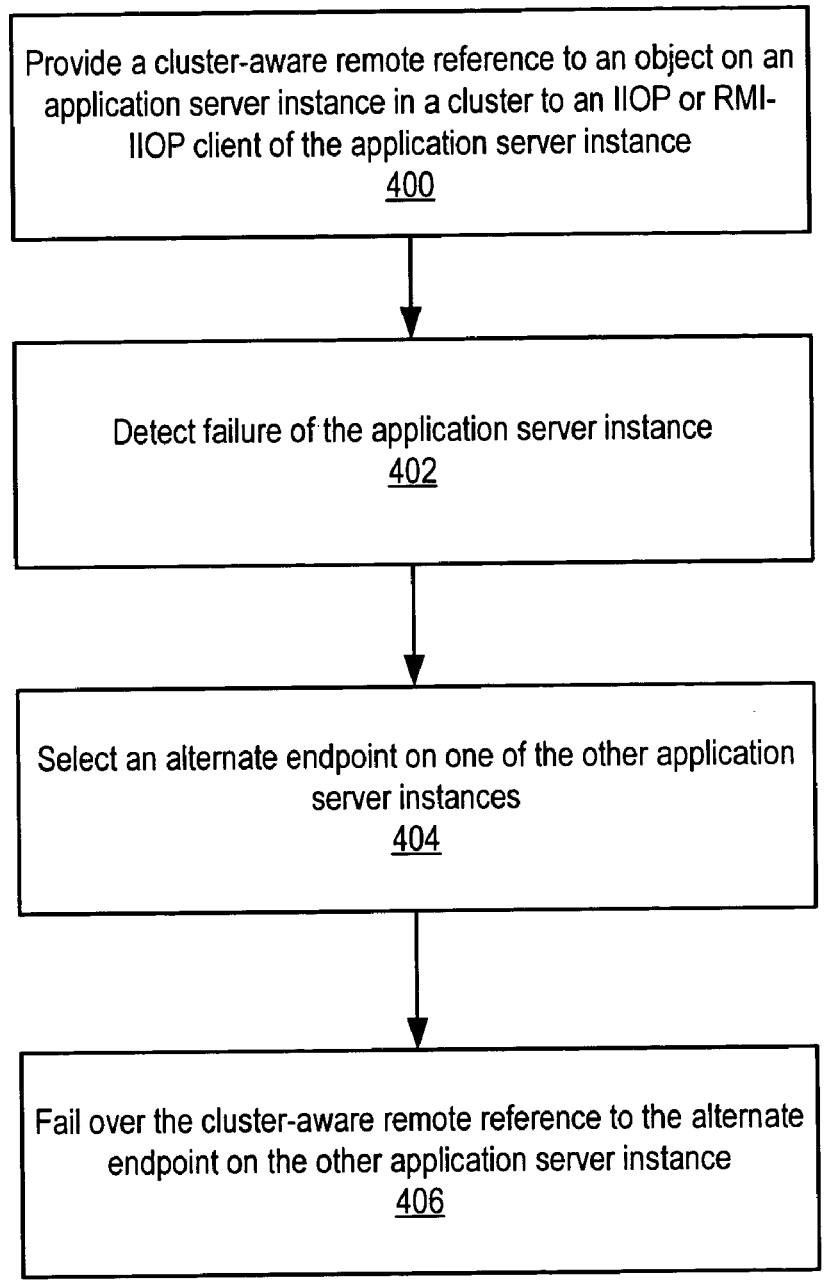
FIG. 4 is a flowchart of a method for failing over remote references according to one embodiment.

FIG. 4 is a flowchart of a method for failing over remote references according to one embodiment. As indicated at 400, a cluster-aware remote reference to an object on an application server instance in a cluster may be provided to an IIOP or RMI-IIOP client of the application server instance. The application server instance may generate the remote reference for the client. Endpoint information for all the application server instances may be included in the cluster-aware remote reference. In one embodiment, application server instance may maintain the endpoint information in a server configuration file.

As indicated at 402, the client may detect failure of the application server instance. In one embodiment, a request on the remote reference may generate a communications failure, as described elsewhere herein. As indicated at 404, the client may select an alternate endpoint on one of the other application server instances from the endpoints in the cluster-aware remote reference. As indicated at 406, the remote reference may be failed over to the alternate endpoint on the other application server instance. In one embodiment, the client may include container information in the request sent to the alternate endpoint. The other (alternate) application server instance may then use this information to generate an identifier for the object on the alternate application server instance and to locate and restore a state for the object from a backend database for storing object states. In one embodiment, the remote reference may remain localized to the alternate application server instance for the lifetime of the client even if the original application server instance becomes available again.

Localization

In one embodiment, when failing over a remote reference, the stickiness of the reference to the failed-over server replica may be maintained. In failing over a remote reference to another application server instance, the state of the object (e.g., EJB) associated with the remote reference and the invocation resulting in the state change of the object, are reflected on that application server instance. To ensure the integrity of the object state, further invocations on the failed-over remote reference by the client are directed to the failed-over application server instance during the lifecycle of the client. This affinity of the failed-over reference may be referred to as the localization or "stickiness" of the reference.

A remote reference (e.g., an Interoperable Reference (IOR)) is published by any one of the application server instances in the cluster. This instance is identified by the primary endpoint published in the remote reference. When the primary endpoint becomes unreachable due to the application server instance that published the remote reference going down, a subsequent request to the remote reference is failed over to an alternate endpoint on another application server instance. For example, if the remote reference was on Server A and Server A becomes unavailable, the remote reference may be failed over to Server B. Later, if Server A becomes available again, requests on the remote reference are still sent to Server B. This is done to ensure that objects underlying the remote reference do not simultaneously exist on two application server instances. For instance, if the remote reference were for a SFSB (Stateful Session Bean, in Java), it would be problematic to have the SFSB state updated and accessed from two application server instances concurrently. Hence, stickiness or localization is maintained for failed-over remote references.

The following describes how the Object Request Broker (ORB) dispatches the request on a remote reference. The remote reference contains an IIOP profile. This profile has the information encoded that relates to the object ID of the object (e.g., EJB) the remote reference targets, and also the primary endpoint on the application server instance that published the reference. In one embodiment, an endpoint is a 2-tuple of the host address and IIOP port at which the target server instance is listening for IIOP requests. When an ORB message is being dispatched, the ORB obtains the primary endpoint, establishes connection, and thereafter sends out the messages/invocations.

In a cluster environment using the request failover mechanism, the primary endpoint dynamically changes to an alternate endpoint when the remote reference is failed over to another accessible IIOP endpoint of the cluster. In one embodiment, this failover to an alternate endpoint is addressed by maintaining a cache of primary endpoints to effective endpoints. The effective endpoint is the application server instance IIOP endpoint in the cluster to which the request has been failed over.

One embodiment may include a localization mechanism for maintaining stickiness of failed-over remote references. In one embodiment, the logic or mechanism to maintain stickiness (the localization mechanism) may be part of a socket factory class. In one embodiment, the localization mechanism maintains a dynamic mapping of original primary endpoint to alternate endpoint for all failed application server instances. For all failed-over requests, the localization mechanism retrieves the primary endpoint from the remote reference and uses it to retrieve the alternate endpoint. The request is then dispatched to the alternate endpoint. This ensures the "stickiness", i.e. provides for localization of the remote reference, during the client lifecycle.

Complex Object Graph of Remote References

In a clustered application server system that provides high availability of remote references using an embodiment of request failover mechanism as described herein, integrity and consistency of remote reference failover may be provided. To accomplish this, if the remote reference held by the client is failed over to another application server instance in the cluster, the client side failover subsystem may ensure that, during the lifecycle of the client, this affinity (stickiness, or localization) is maintained for any further invocations on the remote reference, as described above.

However, localization may be complicated if the client maintains a complex object graph of remote references to objects. For example, if the client holds remote references to a number of EJB objects of different types that in turn are inter-related (holding references to other EJBs either directly or through another Java object), there will be a complex object graph on the client side.

In one embodiment, if the client experiences failover of a remote reference which is part of a complex object graph, the view of localization (failover mapping) maintained by the client may be provided to the application server instance to ensure that the integrity and consistency of the failed-over reference is maintained over the request invocation.

In one embodiment, the client side failover subsystem maintains the failover mapping of the remote references held by the client. In one embodiment, this mapping may be achieved by hashing the primary endpoint of the failed reference to the alternate endpoint. The alternate endpoint identifies the application server instance to which the remote reference has been failed over.

In one embodiment, the integrity and consistency of the failed-over remote reference in a complex object graph may be maintained by propagating the client failover mapping to the application server instance as part of the invocation in the remote reference. The application server instance may then determine that the remote invocation has passed a failover mapping that the application server instance may then use to dispatch any outgoing invocations as part of the received request. In one embodiment, this mapping may be used only within the scope of the received IIOP request.

In one embodiment, the client-side failover subsystem may pass the failover mapping, if it exists, as a service context of the dispatched IIOP request. This may be achieved by registering a failover request interceptor with the client-side ORB. The role of this client-side request interceptor is to encode the failover mapping—the client context—as a service context data of the dispatched IIOP request. The server-side failover subsystem may then detect the presence of the failed over service context data and transfer this failover data—failover mapping—to PICurrent (the server context).

Thereafter, the server may use this request context data, which contains the client failover mapping, in determining the alternate endpoint to which the outgoing request needs to be dispatched. The server-side failover subsystem may include a failover server request interceptor registered with the server-side ORB that decodes and transfers the failover data as previously described.

In one embodiment, this mechanism may be enhanced to carry out bi-directional propagation of failover mapping, i.e. from the client to the application server instance and back to the client as part of the dispatched IIOP request from the client. This enhanced mechanism may handle scenarios where the server side outgoing invocation results in changes to the failover mapping as passed by the client. This state change of the failover mapping may be determined by the failover server request interceptor, causing it to send a reply containing the new failover mapping to the client as a reply service context data.

"Client Thread Sticky" Load Balancing Policy

One embodiment may support a Client Thread Sticky Load Balancing policy. In the Client Thread Sticky Load Balancing policy, all the requests from a client thread get "stuck" to the same application server instance, i.e., the same application server instance is used for the creation of Initial Context objects, for EJBHome lookups, and creation of EJB Object for that thread.

Exemplary Clustered Application Server System

Figure 5:
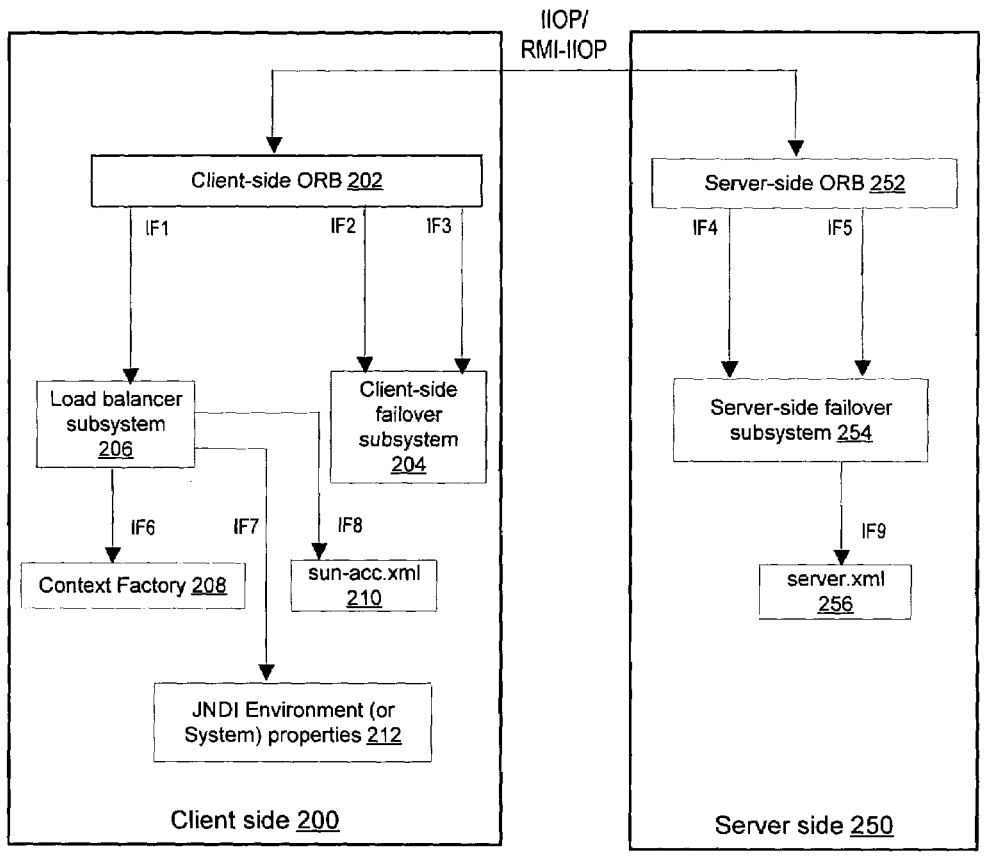
FIG. 5 illustrates an exemplary architecture of a client and application server instance showing the subsystems used to support failover and load balancing according to one embodiment.

The following is a description of the configuration and operation of an exemplary clustered application server system that implements a request failover mechanism and load balancing according to one embodiment. An exemplary architecture for a client and an application server instance that may be used in this exemplary clustered application server system is illustrated in FIG. 5. Note that the configurations, description of operational details, code, command, and file examples, properties, and all other examples and information presented in this section are included for exemplary purposes and describe one possible embodiment, and are not intended to be limiting.

Server-Side Configuration

In one embodiment, the user, via an Administration CLI (Command Line Interface) or a GUI (Graphical User Interface), changes the server configuration file (e.g., server.xml) to define IIOP endpoints that constitute the cluster of application server instances. This change is required regardless of the type of the Client. The new DTD (Document Type Definition) elements to be added in server.xml are described later in this document.

ACC Client Configuration

For Application Client Container (ACC) clients, in one embodiment, "endpoints" and "load balancing policy" properties are defined in a client-side configuration file, e.g. sun-acc.xml. Further description of these properties is provided later in this document. In one embodiment, once these properties are defined, no other change in the application code executing within the ACC is needed.

Standalone Client Configuration

In one embodiment, for standalone clients, prior to instantiation of the Initial Context, certain environment properties are set. These properties may be set as JNDI SPI environment properties or as System Properties. The properties may include one or more of, but are not limited to:

An initial context factory to support load balancing.

A list of one or more IIOP endpoints. The endpoints represent listeners on application server instances or the Name Service. Specifying more than one endpoints ensures that look up of references are highly available.

The type of load balancing policy to be used. One embodiment may support two types of load balancing policy: "lookup-based" and "IC-based". Other embodiments may support one or the other of these two types of load balancing policy and/or one or more other types of load balancing policies.

Further description of the JNDI environment properties is presented later in this document.

The exemplary code snippet below illustrates how the environment properties are set when passed using JNDI SPI, and is not intended to be limiting. In this example, the properties to be passed for creating the Initial Context are set, and an initial naming context is created. In this example, the "Client" code instantiates the JNDI InitialContext Object by calling "new InitialContext(env)", where (env) is the list of JNDI SPI properties listed above. Note that, in one embodiment, these properties may need to be set only for Standalone Clients.

Properties env = new Properties( );
env.put("java.naming.factory.initial","com.sun.apps-erv.naming.AppServerContextFactory");
env.put("com.sun.appserv.iiop.endpoints", "trident:3600, exodus:3700");
env.put("com.sun.appserv.iiop.loadbalancingpolicy", "lookup-based");
// Create an initial naming context
Context initial = new InitialContext(env);

Overview of Load Balancing and Failover

The following is a high level overview of a method for Load Balancing and Failover according to one embodiment, for all clients as described above. This high-level overview is not intended to be limiting:

The "Client" code instantiates the JNDI InitialContext Object by calling "new InitialContext". The "Client" code calls the lookup method on the JNDI InitialContext Object and passes the name of the object being looked up as a parameter.

Depending on the load balancing policy specified, the method invocation may be directed to an appropriate endpoint on an application server instance or a Name Server in the cluster, and a remote reference may be returned. If the remote reference is for an EJB, a reference to the EJBHome Object may be returned. If the lookup is for a Name Service, a reference to the Name Service Object may be returned.

For EJB references, when the "Client" code calls either the "create" or the "findByPrimaryKey" method on the EJB-Home object, an EJB Object may be created on the same application server instance where the EJBHome object resides. A remote reference to the EJB Object may be returned to the "Client". The "Client" application may then use the EJB Object reference, for example, to invoke business methods.

If, between method invocations, the endpoint corresponding to the EJB Object becomes unavailable, then subsequent invocations may be redirected to an alternate endpoint in the cluster. Further, all method invocations made using the same reference may be dispatched to the same alternate endpoint, thereby maintaining locality (stickiness). If the endpoint is not reachable during the above, an alternate endpoint may be selected, and the request may then be dispatched to the alternate endpoint.

FIG. 5 illustrates an exemplary architecture of a client and application server instance showing the subsystems used to support failover and load balancing according to one embodiment. FIG. 5 also depicts the interfaces between the load balancing and failover subsystems and external subsystems and interfaces. Association lines (IF1-IF9) pointing into a subsystem indicate an import into the subsystem, and association lines pointing out indicate an export out of the subsystem. In one embodiment, the load balancing and failover subsystems may include, but is not limited to the following logical subsystems:

Client-side ORB 202
Load Balancer Subsystem 206
Client-side Failover Subsystem 204
Server-side ORB 252
Server-side Failover Subsystem 254

Exported interfaces and/or subsystem that may be enhanced to support load balancing and failover may include one or more of, but are not limited to:

application server Context Factory (Context Factory 208)
server.xml 256
JNDI Environment Properties or System Properties 212, for Standalone Clients
sun-acc.xml 210, for ACC Clients These subsystems and interfaces are further described below.

The labeled Interfaces in FIG. 5 represent:
IF1: ORB API
IF2: Client Request Interceptor
IF3: ORB Socket Factory
IF4: IOR Interceptor
IF5: Server Request Interceptor
IF6: application server context factory
IF7: JNDI Environment Properties
IF8: sun-acc.xml
IF9: server.xml The Load Balancer Subsystem 206 is responsible for distributing requests from "clients" to different server replicas or Name Servers, thereby ensuring higher scalability. In one embodiment, load balancing policies that may be supported by the Load Balancer Subsystem may include, but are not limited to: initial context (IC) based load balancing and lookup based load balancing.

In an IC based load balancing policy, the application server instance used to create the Initial Context is used to service all subsequent requests on the Initial Context. This policy ensures the same "locality" for all the EJBHome and EJB Objects created using a particular Initial Context. This policy is suitable for short-lived "Clients" that do not create too many EJB Objects of different "types".

In a lookup based load balancing policy, a new endpoint is randomly selected from the list of endpoints each time the "Client" does a lookup on the JNDI InitialContext object. Thus, the same "Client" establishes connections to multiple application server instances while accessing Name Service objects or EJBHome objects. This policy is suitable for fine-grained load balancing and gives better load distribution.

Server-Side Failover Subsystem

The Server-side Failover Subsystem 254 is responsible for providing the server-side infrastructure for supporting high availability of remote references. In one embodiment, to provide high availability of remote references, remote references (e.g., IORs) are made cluster-aware, and failed references are failed-over to an alternate endpoint in the cluster as indicated by the cluster aware remote reference when the primary endpoint is unreachable. In one embodiment, achieving this may require collaboration between the Client-side Failover Subsystem 204 and the Server-side Failover Subsystem 254. The role of the Server-side Failover Subsystem 254 may include, but is not limited to the following tasks:

Generating Cluster-Aware remote references (IORs)
Handling EJB Reference Failover Generating Cluster-Aware IORs Remote references, or Interoperable References (IORs) may be made cluster-aware by inserting the endpoints of the application server instances in the cluster into the IORs. The list of endpoints may be derived from the cluster configuration information (e.g., server.xml 256). In one embodiment, the endpoints may be categorized as those configured for non-SSL and those configured for SSL.

In one embodiment, non-SSL IIOP endpoints may be inserted in the IOR as a sequence of tag components, for example of the type TAG_ALTERNATE_IIOP_ADDRESS. The IOR Interceptor interface may provide the mechanism to insert the tag components in the IOR. Further description of IOR Interceptor interface is provided below.

In one embodiment, SSL-enabled IIOP endpoints may be inserted in the IOR by the IOR Interceptor interface as a sequence of TransportAddress within the CSIv2 tag component of type TAG_TLS_SEC_TRANS.

In one embodiment, in either case, the IOR Interceptor may add tag components to the tagged IIOP profile (TAG_INTERNET_IOP) of the inserted IOR. Additionally, the POA used to create these IORs is made persistent. This ensures that all IORs generated by the create_reference API of the POA are cluster-aware and persistent (survive server shutdowns and crashes). The generated IORs contain a TAG_ALTERNATE_IIOP_ADDRESS component, or TAG_TLS_SEC_TRANS tag component in the SSL-enabled case, with host and port for each endpoint.

Figure 6:
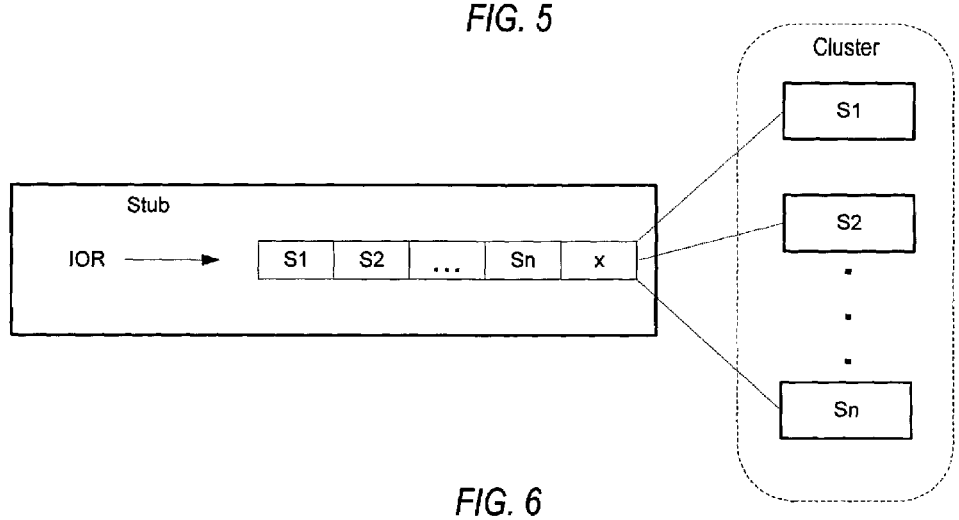
FIG. 6 illustrates a cluster-aware IOR (cluster aware remote reference) according to one embodiment.

FIG. 6 illustrates a cluster-aware IOR according to one embodiment. The IOR in the client stub includes tags for endpoints S1-Sn in the cluster.

Note that, in one embodiment, the IOR Interceptor class may be registered during server initialization, for example as follows:

-Dorg.omg.PortableInterceptor.ORBInitializerClass.
<initializer>=dummy where <initializer> adds an IOR Interceptor.

Handling EJB Reference Failover

In one embodiment, for failover to work correctly in the cluster, the application server instance needs to be able to uniquely identify the EJB container for each failed over request that it receives from the Client. In an exemplary application server implementation, the "Container ID" may be used to uniquely identify the container for a given EJB type. The "Container ID" may be based on a unique identifier, e.g. in the sun-application.xml (for an Application ear) file or the sun-ejb-jar.xml (for a standalone EJB jar) file in Sun application server implementations. The "Container ID" is generated by the deployment framework and is globally unique. Therefore, if the same application is deployed on multiple application server instances within the cluster, there are different "Container IDs" for the same application. The "Container ID" is used to generate the object-key that is embedded in the IOR, and hence the object-key will only work on the specific application server instance on which it is generated. When a request is failed over from one application server instance to another, the object-key generated on one application server instance may be tried on another application server instance. Since this is a different EJB container, the "Container ID" does not match, and the object-key cannot be looked up. Hence, the existing infrastructure in EJB Container is inadequate to handle the EJB Reference failover scenario.

In one embodiment, to uniquely identify the EJB container for each failed over request that it receives from the Client, information required to uniquely identify the EJB Container is tagged in every IOR. In one embodiment, the information is a tuple that contains the application name, the EJB jar name, and the EJB name. When the IOR Interceptor class (e.g., class IORInterceptor) creates a cluster-aware IOR, it sets the Container Information in the TAG_CONTAINER_ID custom tag component in the IOR's IIOP profile. When the Client invokes a method using this IOR, and if the request is failed over, the Client-side Failover subsystem extracts the Container Information from the IOR and adds this information into the request service context (e.g., CONTAINER_ID_SERVICE_CONTEXT) of the IIOP request. In one embodiment, a Server Request Interceptor class (e.g., class ServerRequestInterceptor), registered with the Server-side ORB, performs the following method for EJB Reference failover:

1. The Server Request Interceptor retrieves the "Container ID", encoded in the object-key of the IOR. The Container Factory maintains a mapping of "Container ID" and the corresponding Container. The Server Request Interceptor requests the Container Factory to locate the Container and passes in the "Container ID".

2. If the Container is found, the existing functionality in 7.0 EE is adequate to ensure correct operation.

3. In the case where the request has failed over, the Container will not be found. In this case, the Server Request Interceptor extracts the "Container Information" from the request service context (CONTAINER_ID_SERVICE_CONTEXT) of the IIOP request.

4. The Server Request Interceptor uses the "Container Information" to retrieve the corresponding "Container ID" from the EJB Descriptor.

5. The Server Request Interceptor requests the Container Factory to locate the Container and passes in the new "Container ID". Once the right Container is found, then the existing functionality in 7.0 EE is adequate to ensure correct operation.

6. The Server Request Interceptor requests there Container Factory to update the mapping such that the old "Container ID" points to the correct Container so that, for all subsequent requests, the Container can be found in 1, and therefore 3 through 5 are not needed.

In one embodiment, a Server Request Interceptor class may be registered during server initialization, for example as follows:

-Dorg.omg.PortableInterceptor.ORBInitializerClass.
<initializer>=dummy where <initializer> adds a Server Request Interceptor.

Failover of Name Service References

In one embodiment, Name Service support for publishing EJBHome may be provided via the following transient object implementations:

Transient Naming Context—This is an implementation of the CosNaming Service. ACC "Clients" may interface with this object through the JNDI InitialContext for Name Service operations.

Serial Context Provider Implementation—This object may be published to the CosNaming Service as a sub-context, and is implemented as an RMI-IIOP object. Standalone Java based "Clients" interface with this object, through the JNDI InitialContext, for Name Service operations. This class may also be used by ACC clients to lookup non-EJB objects (e.g.: JDBC DataSource).

In one embodiment, to support persistent and cluster-aware remote references (IORs), a Transient Naming Context object may be instantiated using a persistent POA. This ensures that the reference for the Initial Name Service survives server restarts. Name Service based "Clients" may resolve initial reference to the Name Service using a corbaloc URL to the selected endpoint. If the Name Service lookup is successfully resolved, the IOR obtained is cluster-aware.

In one embodiment, to support persistent and cluster-aware remote references (IORs), a Serial Context Provider Implementation object may be instantiated using a persistent POA. This ensures that the Name Service Remote Reference survives server restarts.

In one embodiment, to support persistent and cluster-aware remote references (IORs) for both of the above classes, the object identifier (objectid) may be hard-coded to ensure that the object is accessible in all application server instances using the same identifier. This ensures that, during failover of the Name Service Remote Reference, the RMI-IIOP invocations on the reference succeed on the failed over application server instance.

Client-Side Failover Subsystem

Referring again to FIG. 5, the Client-side Failover Subsystem 204 works in tandem with the Server-side Failover Subsystem 254 to support high availability of Remote References. The role of the Client-side Failover Subsystem in supporting high availability may include, but is not limited to, the following tasks:

Selecting an alternate endpoint during failover
Insuring "stickiness" of the failed over Reference
Detecting communication failure with application server
Tagging Requests for EJB Reference Failover Selecting an Alternate Endpoint During Failover The functionality described in this section is contingent upon the Server-side Failover Subsystem 254 generating cluster-aware IORs, which was discussed previously. Failover happens only for those requests that cannot reach the target application server instance and thus cause communication failure, e.g. a CORBA COMM_FAILURE exception with return status of COMPLETED_NO, on the "Client".

In one embodiment, an IIOP SSL Socket Factory class (e.g., class IIOPSSLSocketFactory) may implement an ORB Socket Factory interface. When a COMM_FAILURE occurs, the IIOP SSL Socket Factory may be responsible for selecting the alternate endpoint for both the SSL and non-SSL requests. In one embodiment, the IIOP SSL Socket Factory randomly selects the secondary endpoint from the list of endpoints published in the IOR (e.g. in TAG_ALTERNATE_IIOP_ADDRESS IOR tag, or TAG_TLS_SEC_TRANS IOR tag for the SSL case). Once an alternate endpoint is selected, a new IIOP connection socket is opened to it, and the request is failed over to the alternate endpoint. Implementation details for the ORB Socket Factory are described later in this document.

In one embodiment, the ORB Socket Factory class may be registered during client initialization, for example as follows:
-Dcom.sun.CORBA.connection.ORB-
SocketFactoryClass=
IIOPSSLSocketFactory Insuring "Stickiness" of the Failed Over Reference A cluster-aware IOR may be published by any one of the application server instances in the cluster. The application server instance that publishes an IOR may be identified by the primary endpoint published in the IOR. When the primary endpoint becomes unreachable due to the application server instance going down, the request is failed over to an alternate endpoint. All subsequent requests using the IOR are sent to the same endpoint. For example, if the remote reference was on Server 1 and Server 1 becomes unavailable, the remote reference may be failed over to Server 2. Later, if Server 1 becomes available again, requests on the IOR are still sent to Server 2 (referred to as localization, or stickiness). This is done to ensure that the object underlying the IOR does not simultaneously exist on two server instances. For instance, if the IOR is for a SFSB (Stateful Session Bean), it would be problematic to have the SFSB state being updated and accessed from two application server instances concurrently. Hence, it is mandatory that "stickiness" or "localization" is maintained for failed over requests.

In one embodiment, the logic to maintain stickiness may be part of an IIOP SSL Socket Factory class. This class may maintain a dynamic mapping of original primary endpoint to alternate endpoint for all failed application server instances. For all failed over requests, the class retrieves the primary endpoint from the IOR and uses it to retrieve the alternate endpoint. The request is then dispatched to the alternate endpoint.

Tagging Requests for EJB Reference Failover

The above section titled Handling EJB Reference Failover identifies and describes a use case that mandates the tagging of failed over requests with Container Information in the Client-side Failover Subsystem. In one embodiment, tagging requests for EJB reference failover may be handled by a Client Request Interceptor class (e.g., class ClientRequestInterceptor) registered with the ORB. The Client Request Interceptor extracts the custom tag component (e.g., TAG_CONTAINER_ID) that contains the Container Information from the IIOP profile of the invoked IOR (set by the IOR Interceptor). The Client Request Interceptor adds this information into the request service context (e.g., CONTAINER_ID_SERVICE_CONTEXT) of the IIOP request. This information may then be used by the Server-side Failover Subsystem 254 to support the failover of EJB References.

In one embodiment, the Client Request Interceptor class may be registered during client initialization, for example as follows:
-Dorg.omg.PortableInterceptor.ORBInitializerClass.
<initializer>=dummy where <initializer> adds a Client Request Interceptor.

In one embodiment, the tagging of requests is done only for failed over requests.

In one embodiment, when the target endpoint for a request is not reachable, an exception (e.g. a GetEndPointAgain exception) is thrown. The Client Request Interceptor checks for the occurrence of this exception, and if this exception occurs, it inserts the container information into the request service context.

Property and DTD Configuration

This section describes configuration of items including properties and DTDs (Document Type Definitions) to support load balancing and failover in one embodiment. Items that may be configured to support load balancing and failover may include, but are not limited to:
Properties for Standalone Clients
Properties for ACC Clients
Server (e.g. sun-server) DTD Properties for Standalone Clients In one embodiment, properties that may be set for Standalone Clients to support load balancing and failover may include one or more of, but are not limited to, the following. In one embodiment, the properties may be set either on the JNDI InitialContext (as SPI Environment Properties) or passed as System Properties (via the -D flag):
java.naming.factory.initial—This specifies the Context Factory that should be used for load balancing IIOP requests. In one embodiment, this property is only needed for load balancing.
com.sun.appserv.iiop.endpoints—A comma separated list of one or more IIOP endpoints. An IIOP endpoint may be specified as host:port, where host is an IP address or a hostname resolvable by DNS, and the port specifies the port number.
com.sun.appserv.iiop.loadbalancingpolicy—If the endpoints property is specified, then this property is used to specify the load balancing policy. In one embodiment, this property can have one of two values, "lookup-based" or "IC-based".

Properties for ACC Clients

In one embodiment, properties that may be set (e.g., in sun-acc.xml) for ACC Clients to support load balancing and failover may include one or more of, but are not limited to:
com.sun.appserv.iiop.endpoints
com.sun.appserv.iiop.loadbalancingpolicy The description of these properties is identical to the corresponding environment properties described for standalone clients. An example of relevant portions of the application client-container DTD that may be used to specify these properties is given below:
<!-- Application client container configuration -->
<!ELEMENT client-container (target-server, auth-realm?, client-credential?, log-service?, property*)>
<!-- Syntax for supplying properties as name value pairs -->
<!ELEMENT property EMPTY>
<!ATTLIST property name CDATA #REQUIRED
value CDATA #REQUIRED>

Server DTD

To support load balancing and failover, information about all endpoints in a cluster may be maintained in a server configuration file (e.g. server.xml). To provide this information, an "iiop-cluster" element may be included in the server configuration file, for example under an "availability-service" element in a sun-server.dtd. The "iiop-cluster" element defines IIOP endpoints of application server instances forming the cluster. The following is a snippet of an exemplary server DTD that shows examples of these elements:

```
<!ELEMENT availability-service (iiop-cluster?, persistence-store?,
property*)>
<!-- COMMENT Define the application server instances forming the
cluster -->
<!ELEMENT iiop-cluster (iiop-server-instance*)>
<!-- COMMENT Define a server instance in the cluster
      name         Identifies the server instance
--->
<!ELEMENT iiop-server-instance (iiop-endpoint*)>
<!ATTLIST iiop-server-instance name CDATA #REQUIRED>
<!-- COMMENT Define the IIOP endpoints of the server instance
      id           unique identifier for this endpoint
      host         IP address or hostname (resolvable by DNS)
      port         port number
--->
<!ELEMENT iiop-endpoint >
<!ATTLIST iiop-endpoint id        CDATA    #REQUIRED
                        host      CDATA    #REQUIRED
                        port      CDATA    "3600">
```

A snippet of an exemplary server.xml specific to load balancing and failover is shown below:

```
<iiop-cluster>
  <iiop-server-instance name="server1">
    <iiop-endpoint      id="s1_ep1"     host="trident"
       port="3700"/>
    <iiop-endpoint      id="s1_ep2"     host="trident"
       port="3800" ssl-endpoint="server-auth"/>
    <iiop-endpoint      id="s1_ep3"     host="trident"
       port="3900" ssl-endpoint="mutual-auth" />
  </iiop-server-instance>
  <iiop-server-instance name="server2">
    <iiop-endpoint      id="s2_ep1"     host="jupiter"
       port="4700" ssl-endpoint="mutual-auth"/>
    <iiop-endpoint      id="s2_ep2"     host="jupiter"
       port="4800"/>
    <iiop-endpoint      id="s2_ep3"     host="jupiter"
       port="4900"/>
  </iiop-server-instance>
</iiop-cluster>
```

ORB Socket Factory Implementation

In one embodiment, the role of the ORB Socket Factory (e.g., ORBSocketFactory) is to collaborate with the Client-side ORB to obtain a connection that can be used to dispatch a request. The following describes a method of interaction between the Client-side ORB and an IIOP SSL Socket Factory class that implements the ORB Socket Factory interface according to one embodiment. Note that this method is not intended to be limiting:

1. The Client makes a method call on a remote reference.
2. The Client-side ORB calls a "get Endpoint Information" method on the IIOP SSL Socket Factory class to obtain an endpoint.
3. If the "get Endpoint Information" invocation is successful, the method selects a host/port from the cluster-aware IOR and returns that information to the Client-side ORB. If the "get Endpoint Information" invocation fails, go to 9.
4. Using the host/port information in the endpoint, the Client-side ORB checks to see if a connection already exists, and if so, it reuses the existing connection.
5. If no connection exists, the Client-side ORB calls the "create Socket" method on the IIOP SSL Socket Factory class to create a new connection.
6. If the create Socket method is successful, the method returns a connection to the indicated host/port.
7. If the create Socket method cannot create a connection, the ORB Socket Factory class raises a "GetEndPointInfoAgain" Exception.
8. The Client-side ORB catches the "GetEndPointInfoAgain" Exception.
9. The Client-side ORB calls the "get Endpoint Information" method again with the End Point Information returned on the previous call. Note that the "get Endpoint Information" method returns a different host/port on each invocation. If the repeat invocation of "get Endpoint Information" method succeeds, go to 4.
10. If the repeat invocation of "get Endpoint Information" fails, then repeat 9 until either a successful connection is established or all host/ports have been tried.
11. If no connection is established even after trying all available endpoints, a COMM_FAILURE exception is returned by the Client-side ORB to the Client.
12. If an existing connection fails (e.g.: server becomes unavailable), then go to 5.

CONCLUSION

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or CD-ROM, volatile or non-volatile media such as RAM (e.g. SDRAM, DDR, RDRAM, SRAM, etc.), ROM, etc. As well as transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended that the invention embrace all such modifications and changes and, accordingly, the above description to be regarded in an illustrative rather than a restrictive sense.

What is claimed is:

1. An application server cluster system, comprising:
   two or more application server instances in a cluster; and
   an IIOP or RMI-IIOP client of one of the application server instances, wherein the client is configured to:
   detect failure of the application server instance; and
   failover to an alternate one of the application server instances in the cluster in response to said failure of the application server instance.

2. The system as recited in claim 1, wherein the client is configured to remain localized to the alternate application server instance after said failover for the lifetime of the client.

3. The system as recited in claim 1, wherein the client includes a remote reference indicating an endpoint on the application server instance, and wherein, to detect failure of the application server instance, the client is further configured to detect failure of a request to the endpoint on the application server instance.

4. The system as recited in claim 3, wherein, to failover to an alternate one of the application server instances, the client is further configured to determine an alternate endpoint on the alternate application server instance from the remote reference.

5. The system as recited in claim 1, wherein the client comprises a cluster-aware remote reference to an endpoint for an object on the application server instance, and wherein, to failover to an alternate one of the application server instances, the client is further configured to determine an alternate endpoint for a replica of the object on the alternate application server instance from the cluster-aware remote reference.

6. The system as recited in claim 5, wherein, after said failover to the alternate application server instance, the alternate application server instance is configured to restore a state of the object from the failed application server instance to the alternate application server instance.

7. The system as recited in claim 6, wherein the state of the object is restored from a backend database for storing states of objects in the cluster.

8. The system as recited in claim 1, wherein the two or more application server instances are homogeneous.

9. The system as recited in claim 1, wherein the application server instance is configured to provide a cluster-aware remote reference to an object on the application server instance to the client.

10. The system as recited in claim 9, wherein the cluster-aware remote reference indicates a primary endpoint on the application server instance and one or more alternate endpoints on the other application server instances.

11. The system as recited in claim 9, wherein the object is one of an EJB or a Name Service.

12. The system as recited in claim 1, wherein the application server instance comprises a server configuration file comprising configuration information for all the application server instances in the cluster, wherein the configuration information includes endpoint information for all the application server instances in the cluster.

13. The system as recited in claim 12, wherein the application server instance is configured to provide a cluster-aware remote reference to an object on the application server instance to the client, wherein the cluster-aware remote reference indicates a primary endpoint on the application server instance and one or more alternate endpoints on the other application server instances obtained from the server configuration file.

14. The system as recited in claim 1, wherein the client is one of an Application Client Container (ACC) client and a standalone client.

15. The system as recited in claim 1, wherein the client is further configured to load balance requests to the application server instances in the cluster.

16. The system as recited in claim 1, wherein the client is further configured to load balance requests to the application server instances according to one of an initial context-based load balancing policy and a lookup-based load balancing policy.

17. The system as recited in claim 1, wherein the client comprises a cluster-aware remote reference to the application server instances, wherein the cluster-aware remote reference indicates endpoints on the application server instances in the cluster, and wherein the client is further configured to load balance requests to the application server instances in the cluster according to a load balancing policy that is configured to select an endpoint from among the endpoints indicated in the cluster-aware remote reference.

18. The system as recited in claim 1,
wherein the client is further configured to provide a failover mapping indicating one or more remote references associated with a failed-over cluster-aware remote reference to the alternate application server instance; and wherein the alternate application server instance is configured to access the failover mapping to dispatch one or more outgoing invocations to the other remote references indicated by a failed-over request to the failed-over cluster-aware remote reference.

19. An application server cluster system, comprising:
two or more application server instances in a cluster; and
an IIOP or RMI-IIOP client of one of the application server instances, wherein the client is configured to:
  obtain a cluster-aware remote reference to an object on the application server instance from the application server instance, wherein the cluster-aware remote reference indicates a primary endpoint for accessing an instance of the object on the application server instance and one or more alternate endpoints for accessing other instances of the object on the other application server instances;
  detect a communication failure for a request to the primary endpoint for accessing the instance of the object on the application server instance; and
  failover the request to one of the alternate endpoints on one of the other application server instances in response to said communication failure.

20. The system as recited in claim 19, wherein, after said failover to the alternate application server instance, the cluster-aware remote reference remains localized to the alternate application server instance for the lifetime of the client.

21. The system as recited in claim 19, wherein requests on the cluster-aware remote reference continue to go only to the alternate endpoint on the other application server instance if the failed application server instance subsequently becomes available in the cluster.

22. The system as recited in claim 19, wherein, after said failover to the alternate application server instance, the other application server instance is configured to restore a state of the object from the failed application server instance to the other application server instance.

23. The system as recited in claim 22, wherein the state of the object is restored from a backend database for storing states of objects in the cluster.

24. The system as recited in claim 19, wherein the two or more application server instances are homogeneous.

25. The system as recited in claim 19, wherein the object is one of an EJB or a Name Service.

26. The system as recited in claim 19, wherein the application server instance comprises a server configuration file comprising configuration information for all the application server instances in the cluster, wherein the configuration information includes endpoint information for all the application server instances in the cluster.

27. The system as recited in claim 26, wherein the primary endpoint on the application server instance and the one or more alternate endpoints on the other application server instances are obtained from the server configuration file.

28. The system as recited in claim 19, wherein the client is one of an Application Client Container (ACC) client and a standalone client.

29. The system as recited in claim 19, wherein the client is further configured to load balance requests to the application server instances in the cluster.

30. The system as recited in claim 19, wherein the client is further configured to load balance requests to the application server instances in the cluster according to a load balancing policy that is configured to select an endpoint from among the endpoints indicated in the cluster-aware remote reference.

31. The system as recited in claim 19, wherein the client is configured to load balance requests to the application server instances according to one of an initial context-based load balancing policy and a lookup-based load balancing policy.

32. The system as recited in claim 19,
wherein the client is further configured to provide a failover mapping indicating one or more other remote references associated with the cluster-aware remote reference to the alternate application server instance during said failover; and
wherein the alternate application server instance is configured to access the failover mapping to dispatch one or more outgoing invocations to the other remote references indicated by the failed-over request.

33. A system, comprising:
a processor; and
a memory comprising program instructions, wherein the program instructions are executable by the processor to implement an IIOP or an RMI-IIOP client application for accessing a cluster comprising a plurality of application server instances, wherein the client application is configured to:
obtain a cluster-aware remote reference to an object on the application server instances from the cluster, wherein the cluster-aware remote reference indicates a primary endpoint for accessing an instance of the object on one of the application server instances and one or more alternate endpoints for accessing other instances of the object on other application server instances in the cluster;
detect a communication failure for a request to the primary endpoint for accessing the instance of the object on the application server instance; and
failover the request to one of the alternate endpoints on one of the other application server instances in response to said communication failure.

34. The system as recited in claim 33, wherein, after said failover to the alternate application server instance, the cluster-aware remote reference remains localized to the alternate application server instance for the lifetime of the client.

35. The system as recited in claim 33, wherein the object is one of an EJB or a Name Service.

36. The system as recited in claim 33, wherein the client is one of an Application Client Container (ACC) client and a standalone client.

37. The system as recited in claim 33, wherein the client is further configured to load balance requests to the application server instances in the cluster according to a load balancing policy that is configured to select an endpoint from among the endpoints indicated in the cluster-aware remote reference.

38. The system as recited in claim 33, wherein the client is configured to load balance requests to the application server instances according to one of an initial context-based load balancing policy and a lookup-based load balancing policy.

39. A system, comprising:
a processor; and
a memory comprising program instructions, wherein the program instructions are executable by the processor to implement an application server instance in a cluster of application server instances, wherein the application server instance is configured to:
receive a failed-over request to an object on a failed application server instance in the cluster from a client of the failed application server instance; and
restore a state of the object on the failed application server instance to the application server instance in response to said failed-over request received from the client.

40. The system as recited in claim 39, wherein the state of the object is restored from a backend database for storing states of objects on the application server instances in the cluster.

41. The system as recited in claim 39, wherein the application server instances in the cluster are homogeneous.

42. The system as recited in claim 39, wherein the object is one of an EJB or a Name Service.

43. The system as recited in claim 39, wherein the application server instance is further configured to generate cluster-aware remote references for IIOP and RMI-IIOP clients of the application server instance.

44. The system as recited in claim 39, wherein the application server instance is configured to maintain a server configuration file comprising configuration information for all the application server instances in the cluster, wherein the configuration information includes endpoint information for accessing objects on all the application server instances in the cluster, wherein the application server instance is further configured to generate cluster-aware remote references for IIOP and RMI-IIOP clients of the application server instance from the server configuration file.

45. The system as recited in claim 39, wherein the client is one of an Application Client Container (ACC) client and a standalone client.

46. A system, comprising:
client-side means for failing over remote references for IIOP and RMI-IIOP clients of a cluster of application server instances from a failed one of the application server instances to an alternate application server instance; and
means for load balancing requests from the IIOP and RMI-IIOP clients among the application server instances in the cluster.

47. A method, comprising:
providing a cluster-aware remote reference to an object on an application server instance in a cluster of two or more application server instances to an IIOP or RMI-IIOP client of the application server instance, wherein the cluster-aware remote reference indicates a primary endpoint on the application server instance and one or more alternate endpoints on other application server instances in the cluster;
the client issuing a request to the object via the cluster-aware remote reference;
detecting a communication failure for the request, wherein the communication failure indicates failure of the application server instance;
selecting an alternate endpoint on one of the other application server instances from the one or more alternate endpoints indicated by the cluster-aware remote reference; and
failing over the cluster-aware remote reference to the alternate endpoint on the other application server instance.

48. The method as recited in claim 47, wherein the cluster-aware remote reference remains localized to the other application server instance for the lifetime of the client.

49. The method as recited in claim 47, further comprising:
the failed application server instance becoming available in the cluster;
a subsequent request on the cluster-aware remote reference going only to the alternate endpoint on the other application server instance after the failed application server instance becoming available in the cluster.

50. The method as recited in claim 47, further comprising restoring a state of the object from the failed application server instance to the other application server instance.

51. The method as recited in claim 50, wherein the state of the object is restored from a backend database for storing states of objects in the cluster.

52. The method as recited in claim 47, wherein the two or more application server instances are homogeneous.

53. The method as recited in claim 47, wherein the object is one of an EJB or a Name Service.

54. The method as recited in claim 47, wherein the application server instance comprises a server configuration file comprising configuration information for all the application server instances in the cluster, wherein the configuration information includes endpoint information for all the application server instances in the cluster.

55. The method as recited in claim 54, further comprising obtaining the primary endpoint on the application server instance and the one or more alternate endpoints on the other application server instances from the server configuration file.

56. The method as recited in claim 47, wherein the client is one of an Application Client Container (ACC) client and a standalone client.

57. The method as recited in claim 47, further comprising the client load balancing requests to the application server instances in the cluster.

58. The method as recited in claim 47, further comprising the client load balancing requests to the application server instances in the cluster according to a load balancing policy for selecting an endpoint from among the endpoints indicated in the cluster-aware remote reference.

59. The method as recited in claim 47, further comprising the client load balancing requests to the application server instances according to one of an initial context-based load balancing policy and a lookup-based load balancing policy.

60. The method as recited in claim 47, further comprising:
the client providing a failover mapping indicating one or more other remote references associated with the failed-over cluster-aware remote reference to the other application server instance; and
the other application server instance accessing the failover mapping to dispatch one or more outgoing invocations to the other remote references indicated by the failed-over request.

61. A computer-readable storage medium, storing program instructions, wherein the program instructions are computer-executable to implement:
providing a cluster-aware remote reference to an object on an application server instance in a cluster of two or more application server instances to an IIOP or RMI-IIOP client of the application server instance, wherein the cluster-aware remote reference indicates a primary endpoint on the application server instance and one or more alternate endpoints on other application server instances in the cluster;
the client issuing a request to the object via the cluster-aware remote reference;
detecting a communication failure for the request, wherein the communication failure indicates failure of the application server instance;
selecting an alternate endpoint on one of the other application server instances from the one or more alternate endpoints indicated by the cluster-aware remote reference; and
failing over the cluster-aware remote reference to the alternate endpoint on the other application server instance.

62. The computer-readable storage medium as recited in claim 61, wherein the cluster-aware remote reference remains localized to the other application server instance for the lifetime of the client.

63. The computer-readable storage medium as recited in claim 61, wherein the program instructions are further computer-executable to implement:
the failed application server instance becoming available in the cluster;
a subsequent request on the cluster-aware remote reference going only to the alternate endpoint on the other application server instance after the failed application server instance becoming available in the cluster.

64. The computer-readable storage medium as recited in claim 61, wherein the program instructions are further computer-executable to implement restoring a state of the object from the failed application server instance to the other application server instance.

65. The computer-readable storage medium as recited in claim 64, wherein the state of the object is restored from a backend database for storing states of objects in the cluster.

66. The computer-readable storage medium as recited in claim 61, wherein the two or more application server instances are homogeneous.

67. The computer-readable storage medium as recited in claim 61, wherein the object is one of an EJB or a Name Service.

68. The computer-readable storage medium as recited in claim 61, wherein the application server instance comprises a server configuration file comprising configuration information for all the application server instances in the cluster, wherein the configuration information includes endpoint information for all the application server instances in the cluster.

69. The computer-readable storage medium as recited in claim 68, wherein the program instructions are further computer-executable to implement obtaining the primary endpoint on the application server instance and the one or more alternate endpoints on the other application server instances from the server configuration file.

70. The computer-readable storage medium as recited in claim 61, wherein the client is one of an Application Client Container (ACC) client and a standalone client.

71. The computer-readable storage medium as recited in claim 61, wherein the program instructions are further computer-executable to implement the client load balancing requests to the application server instances in the cluster.

72. The computer-readable storage medium as recited in claim 61, wherein the program instructions are further computer-executable to implement the client load balancing requests to the application server instances in the cluster according to a load balancing policy for selecting an endpoint from among the endpoints indicated in the cluster-aware remote reference.

73. The computer-readable storage medium as recited in claim 61, wherein the program instructions are further computer-executable to implement the client load balancing requests to the application server instances according to one of an initial context-based load balancing policy and a lookup-based load balancing policy.

74. The computer-readable storage medium as recited in claim 61, wherein the program instructions are further computer-executable to implement:
 the client providing a failover mapping indicating one or more other remote references associated with the failed over cluster-aware remote reference to the other application server instance; and
 the other application server instance accessing the failover mapping to dispatch one or more outgoing invocations to the other remote references indicated by the failed-over request.

* * * * *